UNITED STATES PATENT OFFICE.

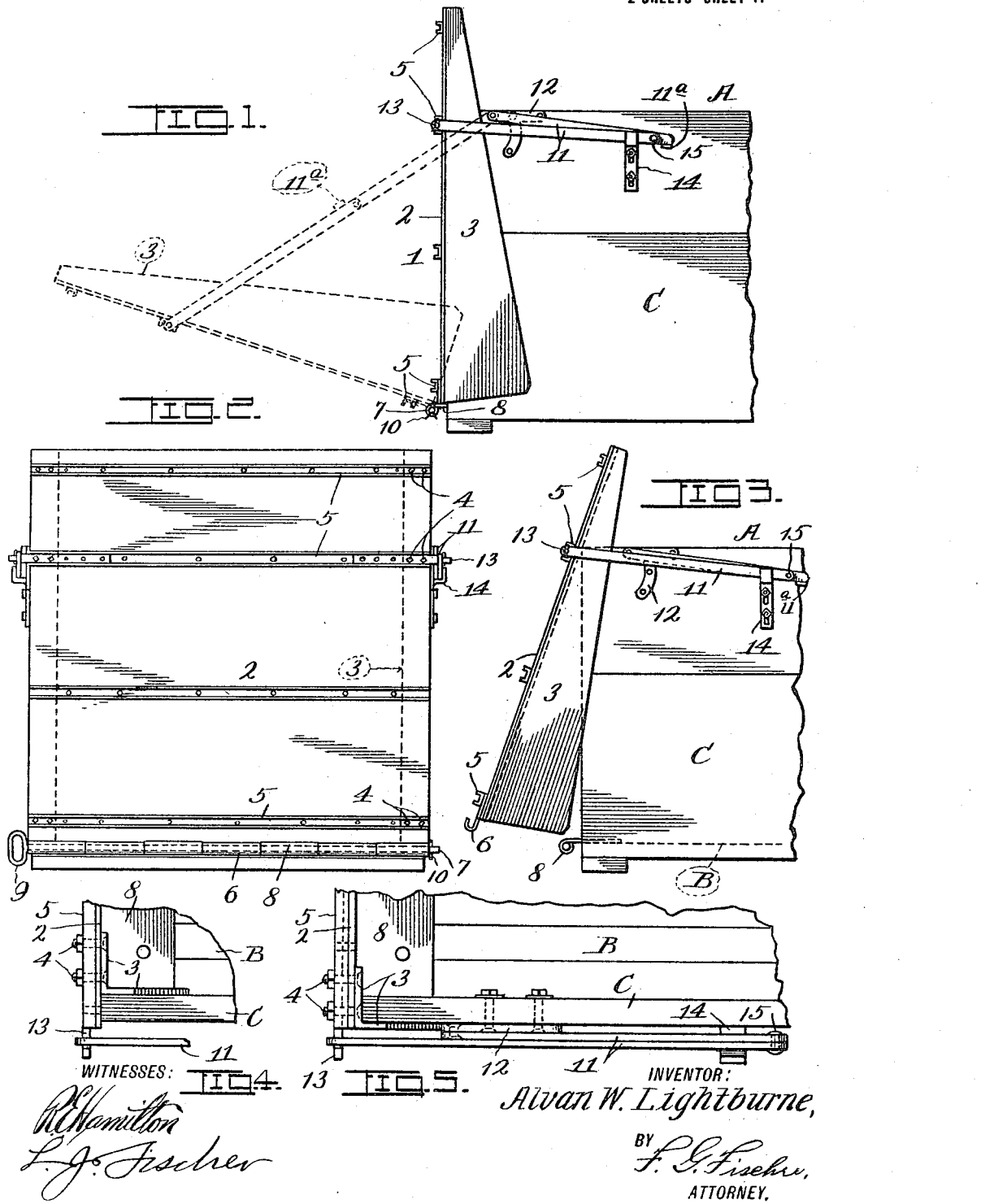

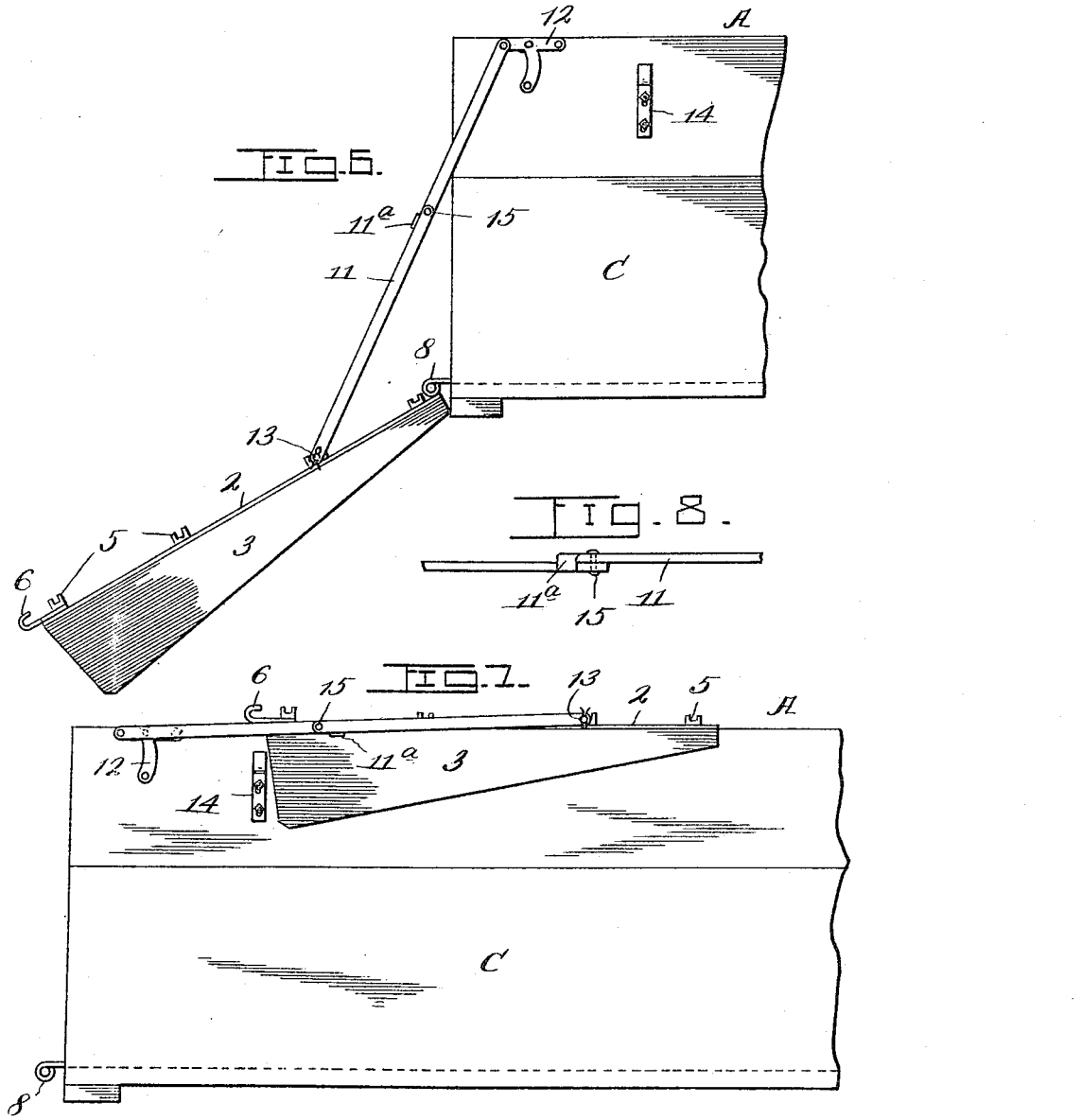

ALVAN W. LIGHTBURNE, OF LIBERTY, MISSOURI.

CONVERTIBLE END-GATE FOR WAGONS.

1,214,045. Specification of Letters Patent. Patented Jan. 30, 1917.

Application filed February 3, 1916. Serial No. 76,039.

*To all whom it may concern:*

Be it known that I, ALVAN W. LIGHTBURNE, a citizen of the United States, residing at Liberty, in the county of Clay and State of Missouri, have invented certain new and useful Improvements in Convertible End-Gates for Wagons, of which the following is a specification.

My invention relates to endgates for wagons, and my object is to provide a simple and inexpensive device of this character, which may be adjusted into different positions to perform the functions of a scoop board, a cattle chute, a rear seat for the wagon, and an apron for directing grain into the chute of an elevator, etc.

Other objects of the invention will hereinafter appear, and in order that said invention may be fully understood, reference will now be made to the accompanying drawings, in which:

Figure 1 is a broken side elevation of a wagon bed provided with my endgate, which is shown closed in full lines and open in dotted lines so that it may perform the function of a scoop board. Fig. 2 is a rear elevation of the parts disclosed by Fig. 1. Fig. 3 is a broken side elevation of the wagon bed with the endgate adjusted to perform the function of an apron in directing grain from the wagon bed to a chute. Fig. 4 is a broken plan view of the wagon bed and the endgate, showing the flanges of the latter adjusted inwardly to fit against the inner surface of the side boards of the wagon-bed. Fig. 5 is a broken plan view of the flanges of the endgate adjusted outwardly to fit against the outer surface of the side boards. Fig. 6 is a broken side elevation with the endgate adjusted to act as a chute in loading or unloading cattle. Fig. 7 is a broken side elevation with the endgate adjusted to act as a rear seat. Fig. 8 is a broken detail of the jointed ends of one of the endgate arms.

A designates the bed of an ordinary farm wagon having a floor B and side boards C.

1 designates the endgate, which consists of a back piece 2 and side members 3. The back piece 2 may be of wood or sheet metal, but the members 3 are of sheet metal bent at right angles, so that their rear flanges can be secured to the back plate 2, while their side flanges may be adjusted to fit either the inner or outer surfaces of the side boards C. With this end in view the members 3 are adjustably-secured to the back piece 2 by bolts 4, passing through registering holes in the back piece 2 and a plurality of channel bars 5, secured to said back piece 2 to reinforce the same and act as cleats in preventing cattle from slipping on the endgate 1, when the same is adjusted to perform the function of a chute, as disclosed by Fig. 6.

The lower portion of the endgate 1 is provided with a hinge member 6 open at its upper end, so that it may be disengaged from a pintle 7, as disclosed by Fig. 3. The hinge member 6 is, preferably, of heavier sheet metal than the back 2 to which it is reliably secured by the lowermost channel-bar 5 and its bolts. The pintle 7 operably-connects the hinge member 6 with a hinge member 8, secured to the floor B of the wagon bed and said pintle 7 is provided at one end with a handle 9, so that it may be withdrawn longitudinally from the hinge members 6 and 8, after the removal of a cotter pin 10 from the opposite end of said pintle.

The endgate 1 is held in the different positions disclosed by Figs. 1, 3 and 6, by a pair of oppositely-disposed foldable arms 11, pivotally-connected at their forward ends to T-fittings 12 and at their rear ends to pivots 13, secured to one of the intermediate channel-bars 5. The short sections of the arms 11 have lips 11$^a$, to overlap the long sections and prevent the connected portions of the arms from breaking downward when in the dotted position disclosed by Fig. 1. Vertically adjustable brackets 14 secured to the side boards C, coact with the arms 11 in holding the endgate 1 in closed position.

When the endgate is to be used as a scoop board from which grain may be shoveled, it is lowered to the dotted position disclosed by Fig. 1. This is accomplished by swinging the connected portions 15 of the arms 11 upward out of engagement with the brackets 14, so that said arms may be unfolded to the dotted position. When the endgate is to be used as an apron for directing grain into an elevator chute, the cotter pin 10 is removed and the pintle 7 is withdrawn from the hinge members 6 and 8, so that said endgate may swing on the pivots 13 to the position disclosed by Fig. 3. The endgate can also be swung to the cattle chute position disclosed by Fig. 6, or to the rear seat position shown by Fig. 7. The endgate also prevents hogs from being crippled preparatory to unloading them on the platform of a shipping station, as the wagon can be backed almost against said platform and the endgate be then opened vertically to allow the hogs to step from the wagon, whereas the ordinary endgate must be opened several feet from the platform and expose the hogs to the danger of falling from the wagon before the same can be backed against the platform.

From the foregoing description, it is apparent that I have produced an endgate embodying all of the features of advantage above-enumerated, and while I have shown and described the preferred form of the invention I reserve the right to make such changes in the construction, combination, and arrangement of parts as properly fall within the spirit and scope of the claims.

Having thus described my invention, what I claim and desire to secure by Letters Patent, is:

1. An end-gate for wagons comprising a back member having spaced series of bolt-receiving openings, a pair of side members each having an inturned flange seating on the back member, and securing bolts passed through each flange and selectively engaged in the openings of the back member.

2. An end-gate for wagons, comprising a back member, and a pair of side members each of which is adjustably secured thereto whereby the same may be moved toward or away from each other so as to engage the inner and outer faces respectively of the sides of the wagon as desired.

In testimony whereof I affix my signature, in the presence of two witnesses.

ALVAN W. LIGHTBURNE.

Witnesses:
F. G. FISCHER,
L. J. FISCHER.

Copies of this patent may be obtained for five cents each, by addressing the "Commissioner of Patents, Washington, D. C."